United States Patent
Nusimovich

(10) Patent No.: US 7,188,571 B2
(45) Date of Patent: Mar. 13, 2007

(54) METHOD AND APPARATUS FOR THE PROCESSING OF CARBON-CONTAINING POLYMERIC MATERIALS

(75) Inventor: Sergio Nusimovich, Nedlands (AU)

(73) Assignee: Tox Free Solutions Limited (AU)

( * ) Notice: Subject to any disclaimer, the term of this patent is extended or adjusted under 35 U.S.C. 154(b) by 0 days.

(21) Appl. No.: 10/495,176

(22) PCT Filed: Nov. 12, 2002

(86) PCT No.: PCT/AU02/01543

§ 371 (c)(1),
(2), (4) Date: May 11, 2004

(87) PCT Pub. No.: WO03/042289

PCT Pub. Date: May 22, 2003

(65) Prior Publication Data

US 2004/0261672 A1   Dec. 30, 2004

(30) Foreign Application Priority Data

Nov. 12, 2001   (AU) .................................. PR8826

(51) Int. Cl.
*F23B 7/00* (2006.01)
(52) U.S. Cl. .................. 110/229; 110/341; 110/233
(58) Field of Classification Search ................ 110/341, 110/229, 233, 246
See application file for complete search history.

(56) References Cited

U.S. PATENT DOCUMENTS

| | | | |
|---|---|---|---|
| 4,084,521 A | | 4/1978 | Herbold et al. |
| 4,203,804 A | * | 5/1980 | Janning et al. .............. 202/121 |
| 4,648,328 A | | 3/1987 | Keough |
| 5,230,777 A | | 7/1993 | Jarrell |

FOREIGN PATENT DOCUMENTS

| | | |
|---|---|---|
| AU | 712838 | 5/1999 |
| JP | 59203683 A2 | 11/1984 |
| WO | WO 97/42015 | 11/1997 |

* cited by examiner

*Primary Examiner*—Kenneth Rinehart
(74) *Attorney, Agent, or Firm*—Fredrikson & Byron, P.A.

(57) ABSTRACT

A method for the processing of carbon-containing polymeric material, the method comprising the steps of: Introducing the carbon-containing polymeric material into the retort of a retort assembly which includes a retort disposed at least partially within the combustion chamber, the retort containing an inert heat-transfer medium and an agitation means, wherein the agitation means is adapted to agitate the inert heat transfer medium and the carbon containing polymeric material, the combustion chamber having heating means to indirectly heat the rotatable retort; Heating the carbon-containing polymeric material and the inert heat transfer medium to cause such to at least partially decompose; Discharging processed carbon-containing polymeric material from the retort.

63 Claims, 8 Drawing Sheets

Model I – Use of pyrolysis condensate oil as fuel for power generation and burners Model II – Use of pyrolysis condensate oil as fuel burners and carbon for power generation

METHOD AND APPARATUS FOR THE PROCESSING OF CARBON-CONTAINING POLYMERIC MATERIALS

FIELD OF THE INVENTION

The present invention relates to a method for the processing of carbon-containing materials and an apparatus when used for the processing of carbon-containing materials. More specifically, the method and apparatus of the present invention relate to the processing of carbon-containing polymeric materials, including tyres, plastics, and paper.

BACKGROUND ART

Waste products comprising carbon-containing polymeric materials constitute one of the most significant environmental problems facing the world today. Polymeric materials make up a significant fraction of municipal solid waste, reaching up to 50% of the total volume, as estimated by the U.S. Environmental Protection Agency. Recycling technologies, faced with difficulties such as having to segregate different types of plastics, poor economics and low quality final products, have failed to address the problem. The non-biodegradability of such polymeric waste material presents further problems.

Present methods and/or apparatus for the processing of carbon-containing polymeric materials have been directed to the processing of specific carbon-containing polymeric wastes. It is one object of the present invention to provide a method and apparatus for the processing of carbon-containing waste materials that is capable of processing a wide range of carbon-containing polymeric waste materials, including mixed products, such as different types of plastics.

The preceding discussion of the background to the invention is intended to facilitate an understanding of the present invention. However, it should be appreciated that the discussion is not an acknowledgement or admission that any of the material referred to was part of the common general knowledge in Australia as at the priority date of the application.

Throughout the specification, unless the context requires otherwise, the word "comprise" or variations such as "comprises" or "comprising", will be understood to imply the inclusion of a stated integer or group of integers but not the exclusion of any other integer or group of integers.

DISCLOSURE OF THE INVENTION

In accordance with the present invention, there is provided an apparatus, when used for the processing of a carbon-containing polymeric material, the apparatus comprising a retort assembly which includes a retort disposed at least partially within a combustion chamber, the retort containing an inert heat-transfer medium, and an agitation means and the combustion chamber having heating means to indirectly heat the retort, wherein the agitation means is adapted to agitate the inert heat transfer medium and the carbon containing polymeric material.

Similar apparatus have been described for the separation of volatile materials from soils and the like. In such applications, the aim is to separate the volatile material from the medium with a minimum of chemical degradation of the volatile material. However, a primary aim of the treatment of carbon-containing polymeric materials involves chemical degradation of the polymeric materials by processes such as pyrolysis. It has been found that the enhanced heat transfer properties of the retort and the ability to control residence times afforded by the agitation means, are advantageous in applications requiring the breakdown of polymeric materials.

The application of apparatus for the processing of carbon-containing materials similar in design and operation to those described for the separation of volatile materials offers tremendous potential as it allows the user considerable flexibility. The dual application of the equipment of the present invention is counter-intuitive to its existing applications. Whilst the thermal desorption is a separation process that attempts to minimise breakdown of the products fed into the unit, pyrolysis is a physicochemical process that aims to synthesise new compounds by producing the breakdown, combination, and molecular rearrangement of the initial products.

Commercial interest in the pyrolysis process is hence increased when pyrolysis is maximised and separation of the unreacted initial products is minimised. Moreover, the process offers a higher commercial potential when pyrolysis is carried out under controlled conditions, where the operator can control a set of variables that would allow him to selectively synthesise certain fractions.

Preferably, the agitation means is adapted to agitate the inert heat transfer medium and the carbon containing polymeric material to create a fluidised bed, or fluidised bed-like effect.

Preferably, the agitation means is controllable, whereby the residence time of the solid material in the retort may be controlled.

In one form of the invention, a longitudinal axis of the retort is inclined to the horizontal, and is bottom fed. Preferably, the longitudinal axis of the retort is substantially vertical and the retort is bottom fed. Preferably, where the retort is substantially vertical and the retort is bottom fed, the agitation means is further adapted to facilitate the transport of the polymeric material and the inert heat-transfer medium through the retort. In one form of the invention, the agitation means is provided in the form of an auger.

Preferably still, the retort is adapted to allow the exclusion of air or oxygen.

The apparatus and process object of the present invention offer the means to control key variables that affect the final composition and characteristics of the fractions obtained by pyrolysis, whilst allowing for the processing of a wide range of products. This is a distinctive difference with other pyrolysis processes that do not allow for the control of variables such as residence time.

The application of such technologies known for the treatment of contaminated soils to the processing of carbon-containing polymers is also hindered by a number of factors, due to their design and operation. Directly fired thermal desorbers are designed to process soil with volatile compounds. These apparatus produce the combustion of the polymers or hydrocarbons contained in the soil. Indirectly fired thermal desorbers, if operating in the presence of oxygen or air, do cause the degradation of compounds by oxidation or partial combustion, which also compromises their capabilities as controlled-pyrolysis apparatus. More important, all of these machines are designed to remove volatile or semi-volatile compounds from solids or sludge. Their use as pyrolysis reactors is impeded by their design and operation, mainly their heat transfer processes, fluid mechanics, the absence of a solid inert heat transfer medium inside the unit, and residence time, and more specifically, their inability to process pure polymers.

In one form of the invention, the retort comprises a substantially cylindrical body.

In one form of the invention, the substantially cylindrical body is mounted for rotation about its longitudinal axis.

The agitated retort allows for the control of the residence time, the retaining of the heat transfer medium, an intimate contact with said heat transfer medium, and the possibility to add other chemicals such as cracking catalysts to enhance the process.

Preferably still, the retort is substantially surrounded by the combustion chamber to enable direct heating of the retort.

Preferably, the apparatus further comprises a high temperature filter through which the gaseous stream may pass after leaving the retort and prior to entering the afterburner.

In one form of the invention, the heat transfer medium is provided in the form of sodium silicate, or sand.

In another form of the invention, the heat transfer medium is provided in the form of alumina.

In one form of the invention, the retort contains one or more catalyst to improve the ratio of some of the fractions of the final products over the total of products obtained from the pyrolysis. These catalysts are of the type used in petroleum refining operations, in the cracking of hydrocarbons, obvious to those skilled in the art.

In a further form of the invention, the apparatus additionally comprises an afterburner, means to transfer a gaseous stream from the retort to the afterburner for combustion and means for passing the combustion gases from the afterburner to the retort assembly to provide heat for heating carbon-containing polymeric material in the retort.

In one form of the invention, the apparatus further comprises one or more condensers wherein each condenser is adapted to condense gaseous products produced by heating the polymeric material.

In one form of the invention, the apparatus further comprises a combustion engine, wherein the engine is adapted to receive and be fuelled by condensed gaseous products produced by heating the polymeric material until it decomposes, pyrolyses or desorbs. In one form of the invention, the engine is a gas turbine adapted to generate electricity from the gases produced from the decomposition of the polymeric materials, without prior condensation.

In accordance with the present invention, there is provided a method for the processing of carbon-containing polymeric material, the method comprising the steps of:
Introducing the carbon-containing polymeric material into the retort of a retort assembly which includes a retort disposed at least partially within the combustion chamber, the retort containing an inert heat-transfer medium and an agitation means, wherein the agitation means is adapted to agitate the inert heat transfer medium and the carbon containing polymeric material, the combustion chamber having heating means to indirectly heat the rotatable retort;
Heating the carbon-containing polymeric material and the inert heat transfer medium to cause such to at least partially decompose;
Discharging processed carbon-containing polymeric material from the retort.

Preferably, the agitation means is adapted to agitate the inert heat transfer medium and the carbon containing polymeric material to create a fluidised bed, or fluidised bed-like effect.

Preferably, the agitation means is controllable, whereby the residence time of the solid material in the retort may be controlled.

In one form of the invention, a longitudinal axis of the retort is inclined to the horizontal, and is bottom fed. Preferably, the longitudinal axis of the retort is substantially vertical and bottom fed. Preferably, where the retort is substantially vertical and bottom fed, the agitation means is further adapted to facilitate the transport of the polymeric material and the inert heat-transfer medium through the retort. In one form of the invention, the agitation means is provided in the form of an auger.

Preferably still, the retort is adapted to allow the exclusion of air or oxygen.

In one form of the invention, the retort comprises a substantially cylindrical body.

In one form of the invention, the substantially cylindrical body is mounted for rotation about its longitudinal axis.

Preferably still, the retort is substantially surrounded by the combustion chamber to enable direct heating of the retort.

Preferably, the apparatus further comprises a high temperature filter through which the gaseous stream may pass after leaving the retort and prior to entering the afterburner.

In one form of the invention, the heat transfer medium is provided in the form of sodium silicate, or sand.

In another form of the invention, the heat transfer medium is provided in the form of alumina.

In another form of the invention, the retort contains one or more catalyst to improve the ratio of some of the fractions of the final products over the total of products obtained from the pyrolysis. These catalysts are of the type used in petroleum refining operations, in the cracking of hydrocarbons, obvious to those skilled in the art.

Preferably, the steps of the method are performed concurrently.

In a preferred form of the invention, the method comprises the further step of:
Controlling the rate of passage of the carbon-containing polymeric material through the retort, such that the carbon-containing polymeric material is retained in the retort for a predetermined residence time.

Preferably, the step of heating the carbon-containing polymeric material to cause such to at least partially decompose is performed in a substantially oxygen-free atmosphere. In a specific form of the invention, the step of heating the carbon-containing polymeric material to cause such to at least partially decompose is performed in an inert gas atmosphere. In a highly specific form of the invention, the step of heating the carbon-containing polymeric material to cause such to at least partially decompose is performed in an atmosphere substantially comprising nitrogen gas.

In a specific form of the invention, the carbon-containing polymeric material is provided in the form of one or more tyres.

In another form of the invention, the carbon-containing polymeric material is provided in the form of plastics. These plastics can be pure streams of waste polyethylene, polyethylene terphtalate, polypropylene, polystyrene, or PVC, or mixtures thereof. In the case of processing polymers containing halogens, such as PVC, the invention comprises the treatment of the gas stream produced from the pyrolysis to remove hydrogen chloride.

In another form of the invention, other carbon-containing polymers are fed into the unit, such as paper or wood, where the cellulosic fibres are pyrolysed to produce fractions of shorter molecules with properties consistent with those of liquid fuels obtained from biomass.

Where the carbon-containing polymeric material is provided in the form of tyres, the step of heating the carbon-containing polymeric material to cause such to at least partially decompose more specifically comprises the step of heating the tyres to between about 400–800° C. Preferably still, the tyres are heated to between about 450–600° C. In a specific form of the invention, the tyres are heated to 450° C. Where the carbon-containing polymeric material is provided in the form of tyres, the residence time of the tyres in the retort is preferably between about 30 and 240 minutes. Preferably still, the residence time is between about 45 and 180 minutes. In a specific form of the invention, the residence time is approximately 130 minutes.

Preferably, the method of the present invention takes place at atmospheric pressure or near atmospheric pressure. As would be understood by a person skilled in the art, increases in pressure reduce the temperature range.

Where the carbon-containing polymeric material is provided in the form of tyres, the step of introducing the carbon-containing polymeric material into the retort of a retort assembly more specifically comprises introducing the carbon-containing polymeric material into the retort at between approximately 200 kg per hour to 2000 kg per hour.

Preferably, where the carbon-containing polymeric material is provided in the form of tyres, before the step of introducing the carbon-containing polymeric material into the retort, the method of the present invention comprises the preliminary step of shredding the tyres.

Where the carbon-containing polymeric material is provided in the form of plastics, the step of heating the carbon-containing polymeric material to cause such to at least partially decompose more specifically comprises the steps of heating the carbon-containing polymeric material to melt such before heating the carbon-containing polymeric material to pyrolyse such.

Where the carbon-containing polymeric material is provided in the form of plastics, the step of heating the carbon-containing polymeric material to cause such to at least partially decompose more specifically comprises the step of heating the plastic to between about 300 and 1200° C. Preferably still, the plastics are heated to between about 450–1000° C. In a specific form of the invention, the plastics are heated to about 550° C.

Where condensate is desired over gaseous products, lower temperatures in the range of approximately 400–500° C. are used. Where gaseous products are desired over condensate, higher temperatures may be used.

Where the carbon-containing polymeric material is provided in the form of plastics, the residence time of the tyres in the retort is preferably between about 30 and 240 minutes. Preferably still, the residence time is between about 45 and 120 minutes. In a specific form of the invention, the residence time is approximately 80 minutes.

Where the carbon-containing polymeric material is provided in the form of a cellulosic material, such as paper or wood, the step of heating the carbon-containing polymeric material to cause such to at least partially decompose more specifically comprises the step of heating the cellulosic material to between about 400 and 800° C. Preferably still, the cellulosic material is heated to between about 450–800° C. In a specific form of the invention, the cellulosic material is heated to about 500° C.

Where the carbon-containing polymeric material is provided in the form of cellulosic material, the residence time of the cellulosic material in the retort is preferably between about 30 and 240 minutes. Preferably still, the residence time is between about 45 and 120 minutes. In a specific form of the invention, the residence time is approximately 80 minutes.

The method of the present invention may further comprise the step of:
Reducing the pressure in the retort to enable lower temperatures to be used.

The step of discharging processed carbon-containing polymeric material from the retort may include:
Separating the heat transfer medium from the processed carbon-containing polymeric material More specifically, the step of separating the heat transfer medium from the processed carbon-containing polymeric material comprises:
Separating the heat transfer medium from the processed carbon-containing polymeric material based on density differences.

In one form of the invention, the carbon-containing polymeric material decomposes into at least a gaseous stream.

Where the carbon-containing polymeric material decomposes into a gaseous stream, the method may comprise the step of:
Filtering the gaseous stream to remove particulate material therefrom.

Where the carbon-containing polymeric material decomposes into a gaseous stream, the method may comprise the step of:
Condensing at least a portion of the gaseous stream to produce a condensate.

The step of condensing at least a portion of the gaseous stream, may more specifically comprise:
Fractionating at least a portion the gaseous stream to produce a range of condensate fractions.

Where the method comprises the step of condensing at least a portion of the gaseous stream to produce a condensate, the method may comprise the further step of:
Subjecting the condensate to flash distillation.

Where the carbon-containing polymeric material decomposes into a gaseous stream, the method may comprise the step of:
Combusting the gaseous stream to provide heat for heating the carbon-containing polymeric material.

Where the carbon-containing polymeric material decomposes into a gaseous stream, the method may comprise the step of:
Combusting the gaseous stream in a gas turbine to generate heat and electricity.

Where the carbon-containing polymeric material decomposes into a gaseous stream, the method may comprise the step of:
Combusting the gaseous stream in an afterburner or thermal oxidiser.

In one form of the invention, the carbon-containing polymeric material decomposes into at least a solid product.

Where the carbon-containing polymeric material decomposes into a solid product, the method may comprise the step of:
Extracting the solid material from the retort.

The carbon-containing polymeric material may be provided in the form of a solid or a liquid.

Where the carbon-containing polymeric material is provided in the form of a solid, the carbon-containing polymeric material may be passed through a grizzly or sieve, to remove oversized material, prior to being introduced into the retort. In one form of the invention, where carbon-containing polymeric material may be provided in the form of a solid, in addition to or as an alternative to passing such through a grizzly or sieve, the carbon-containing polymeric material may be milled prior to being introduced into the retort.

Where the carbon-containing polymeric material is provided in the form of a solid, the carbon-containing polymeric material may be shredded or milled to reduce particle size and may include a separation stage. During this separation stage, metals or other material may be separated from the carbon-containing polymers.

Where the carbon-containing polymeric material is provided in the form of a liquid, the water content of the carbon-containing polymeric material is preferably minimised prior to introducing such into the retort. This may be achieved by preheating the liquid carbon-containing polymeric material to boil off any water.

In accordance with the present invention there is provided an apparatus, when used for the processing of a carbon-containing polymeric material, the apparatus being substantially as described in Australian patent 712838, the contents of which are hereby incorporated by reference.

BRIEF DESCRIPTION OF THE DRAWINGS

The present invention will now be described, by way of example only, with reference to seven embodiments thereof and the accompanying drawings, in which.

It is to be understood that the embodiments are described by way of example only, and are not to be construed as in any way limited the scope of the invention as described. Further, it should be understood that the features described in two or more embodiments may be combined to produce an apparatus and/or method for processing carbon-containing polymeric material within the scope of the present invention.

BEST MODE(S) FOR CARRYING OUT THE INVENTION

Figure 1:
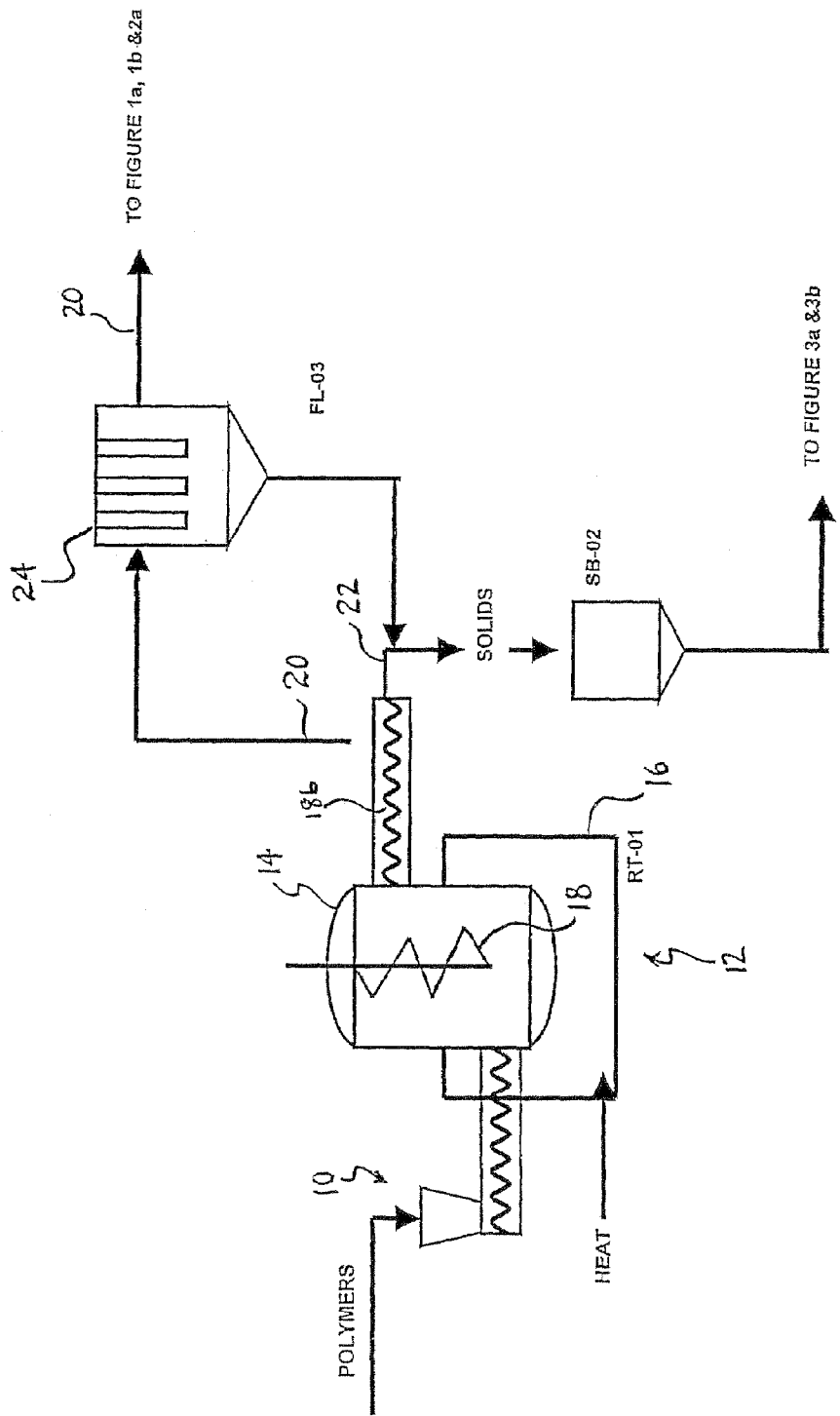
FIG. 1 is a schematic representation of a portion of an apparatus for processing carbon-containing polymeric material.

In FIG. 1 there is schematically shown a portion of an apparatus for processing a carbon-containing polymeric material, comprising a polymer feed assembly 10, and retort assembly 12. The retort assembly 12 in turn comprises a substantially cylindrical body 14 vertically disposed within a combustion chamber 16, the combustion chamber having heating means (not shown) to indirectly heat the cylindrical body 14.

The retort assembly 12 is substantially similar to the retort assemblies described in Australian Patent 712838, the contents of which are hereby incorporated by reference.

The retort assembly 12 further comprises an auger or stirrer 18 to agitate the contents of the retort and drive the product from the feed point to the outlet and provide an adequate residence time. An extraction system 18b such as an auger is adapted to extract solid material from the cylindrical body 14. The cylindrical body 14 contains an inert heat transfer medium in the form of sand.

Carbon-containing polymeric material is fed into the cylindrical body 14, which is heated by way of the combustion chamber 16 causing, depending on the conditions applied within the cylindrical body 14, the carbon containing polymeric material to thermally decompose into a gaseous phase 20, and/or a solid phase 22 in varying proportions. The decomposition of the carbon-containing polymer is achieved by both heat and residence time, with the residence time regulated by the movement of the stirrer or auger 18b that carries the carbon-containing polymer and the inert heat transfer medium in a resulting upward path from the inlet fed by the polymer feed assembly 10 to the outlet, thereby forming a fluidised bed-like arrangement. The gas stream 20, produced by the decomposition or desorption of the carbon-containing polymer subjected to indirect heat, is driven off the retort 14 by the effect of the vaporisation and the difference in pressure between the retort 14 and a filtration assembly 24. The solid phase 22 is removed from the cylindrical body 14 by way of the auger 18b, and separated from the heating medium based on differing densities. The gaseous phase 20 is then passed through the filtration assembly 24.

Figure 2:
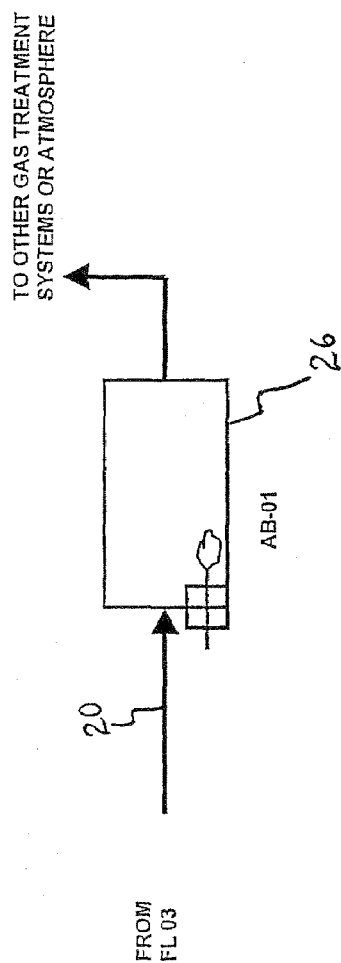
FIG. 2 is a schematic representation of a gas treatment portion of an apparatus for processing carbon-containing polymeric material in accordance with a first embodiment of the invention.

Referring now to FIG. 2, in a first embodiment the gaseous phase 20 is then be passed to an afterburner or thermal oxidiser 26, where the gases are subjected to combustion. Gases produced by the afterburner may be subjected to further treatment.

Figure 3:
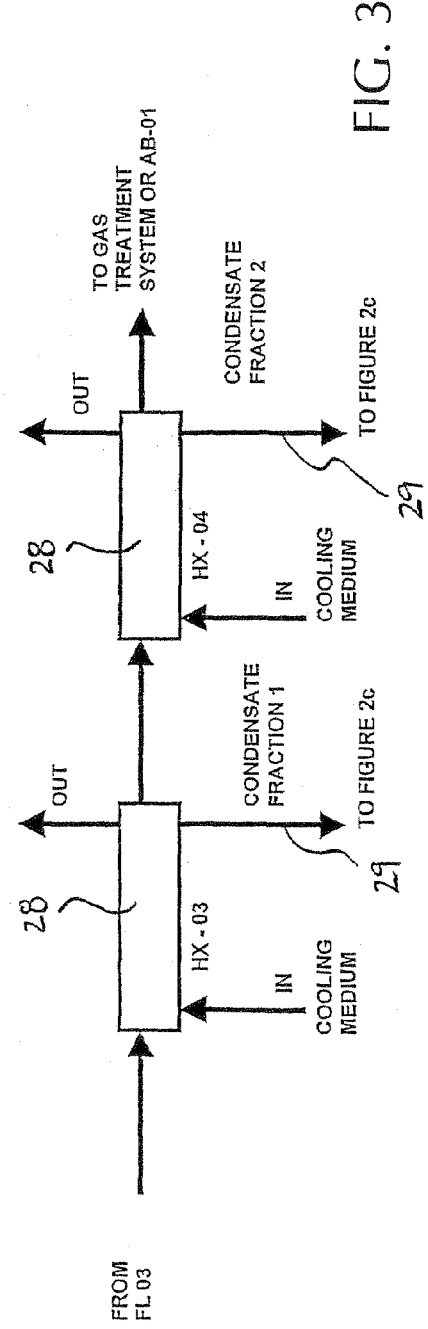
FIG. 3 is a schematic representation of a gas treatment portion of an apparatus for processing carbon-containing polymeric material in accordance with a second embodiment of the invention.

Referring now to FIG. 3, in a second embodiment, after passage through the filtration assembly 24, the gaseous stream is condensed, totally or partially, by way of a series of condensers 28 to produce one or more condensates 29. Uncondensed gases may be passed to an afterburner 26 as described in the first embodiment, or directly treated.

Figure 4:
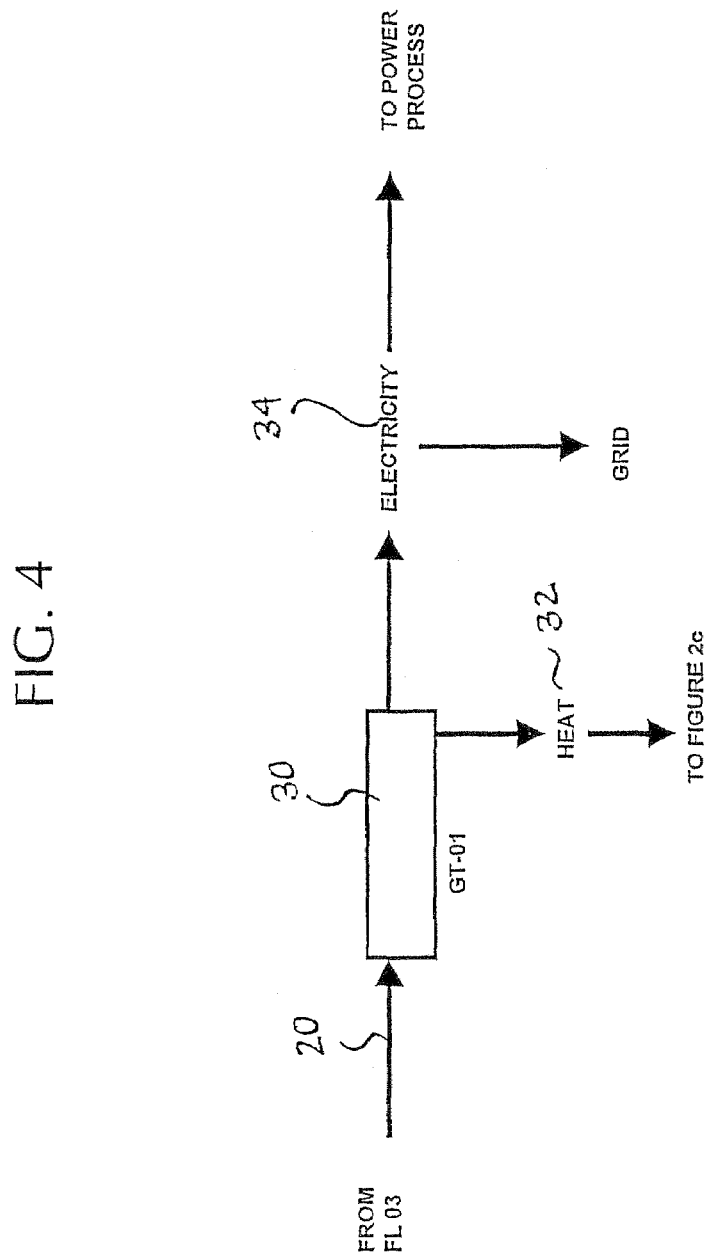
FIG. 4 is a schematic representation of a gas treatment portion of an apparatus for processing carbon-containing polymeric material in accordance with a third embodiment of the invention.
Figure 5:
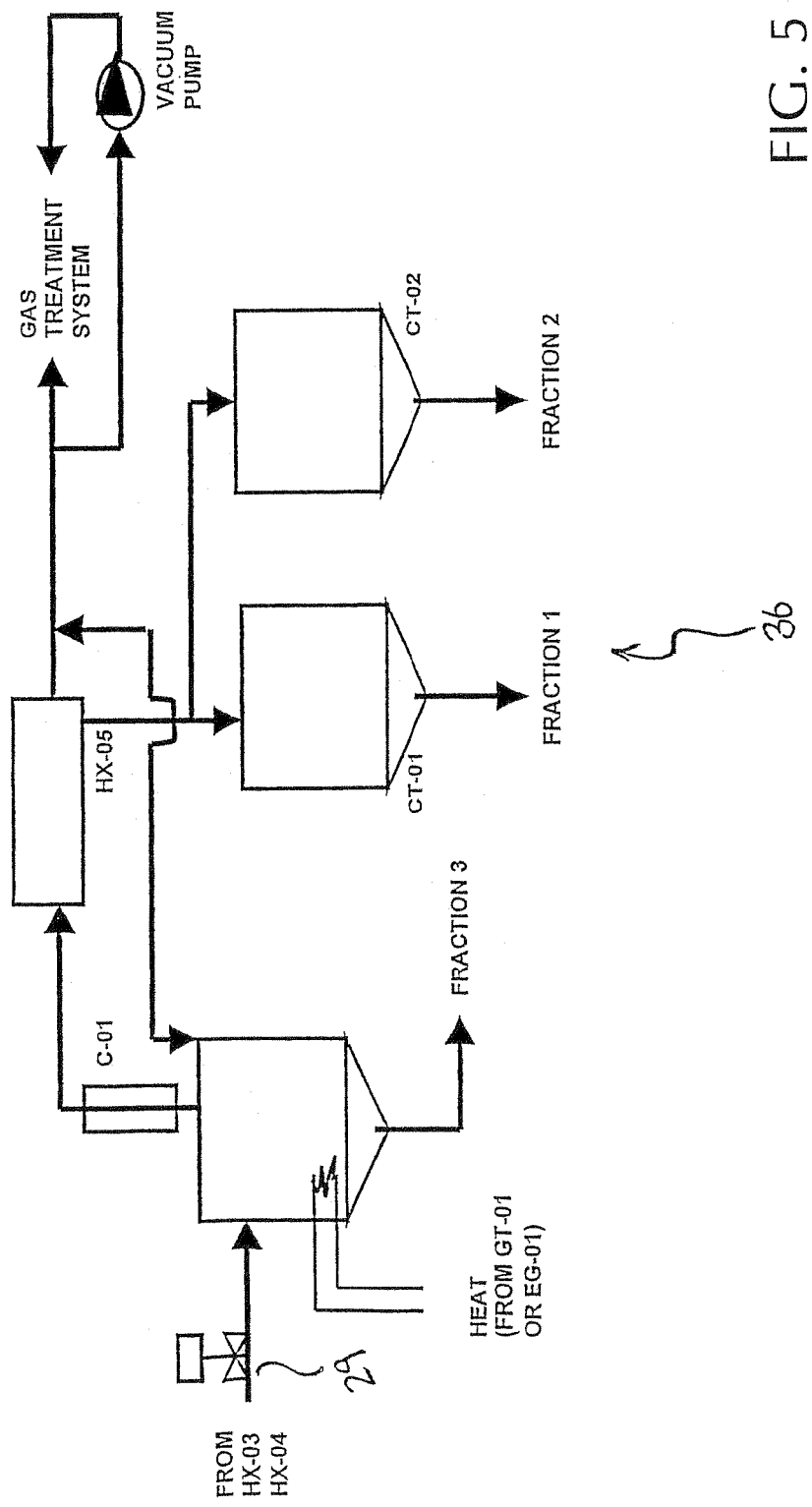
FIG. 5 is a schematic representation of a gas treatment portion of an apparatus for processing carbon-containing polymeric material in accordance with a fourth embodiment of the invention

Referring now to FIG. 4, in a third embodiment, after passage through the filtration assembly 24, the gaseous stream may be fed directly into a gas turbine 30, by which heat 32 and electricity 34 are generated. The electricity 34 is supplied to a power grid or used to supply power to the process. The heat 32 produced by the gas turbine 30 and may be used to heat the cylindrical body 14. At least a portion of the heat may also be used in other processes such as evaporation of water or pre-heating of the carbon-containing polymeric material. Referring now to FIG. 5, in a fourth embodiment, the condensate 29 formed in the second embodiment is passed through a flash distillation assembly 36, to further fractionate such.

Figure 6:
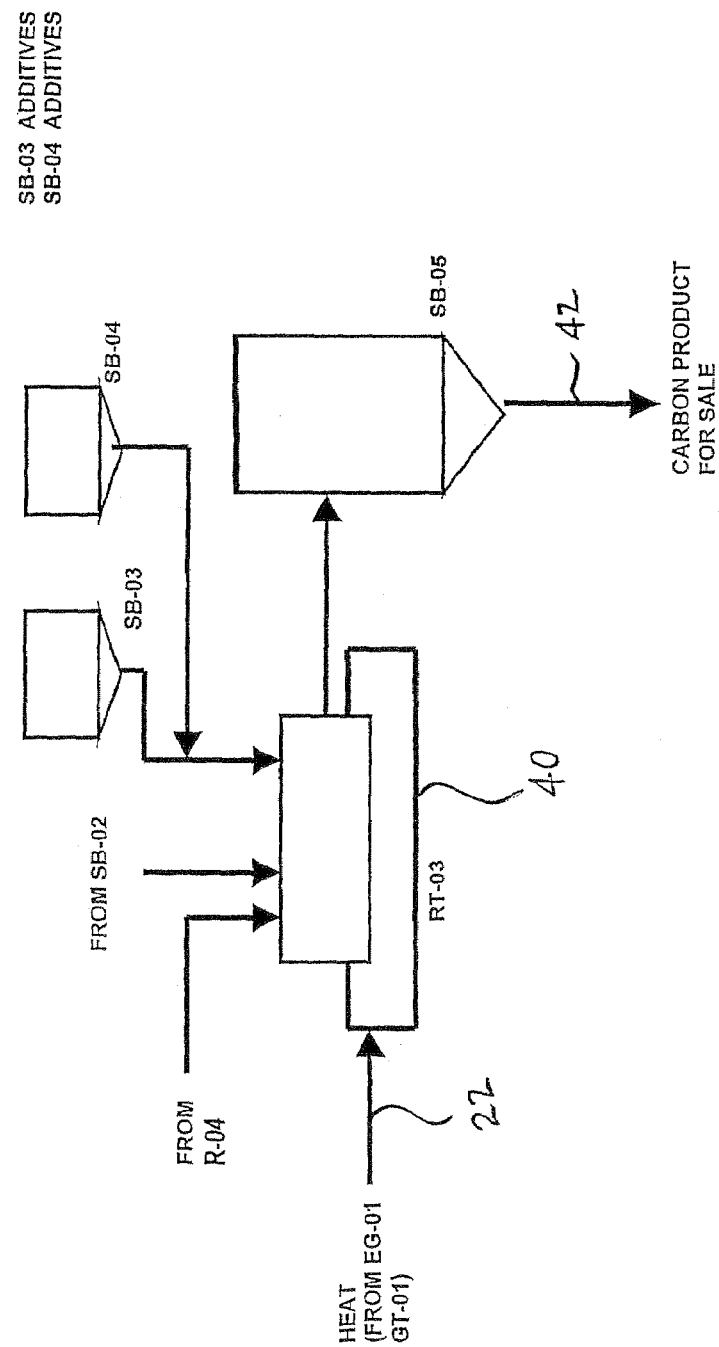
FIG. 6 is a schematic representation of a solids treatment portion of an apparatus for processing carbon-containing polymeric material in accordance with a fifth embodiment of the invention.

Referring now to FIG. 6, in a fifth embodiment, the solid material 22 is heated in a further retort assembly 40 to produce a carbon product 42, and may be combined with one or more additives 38. The heat may be produced by the gas turbine 30 or an engine. The product 42 has applications in the processing of contaminated water or contaminated gas, in the removal of organic compounds and heavy metals.

Figure 7:
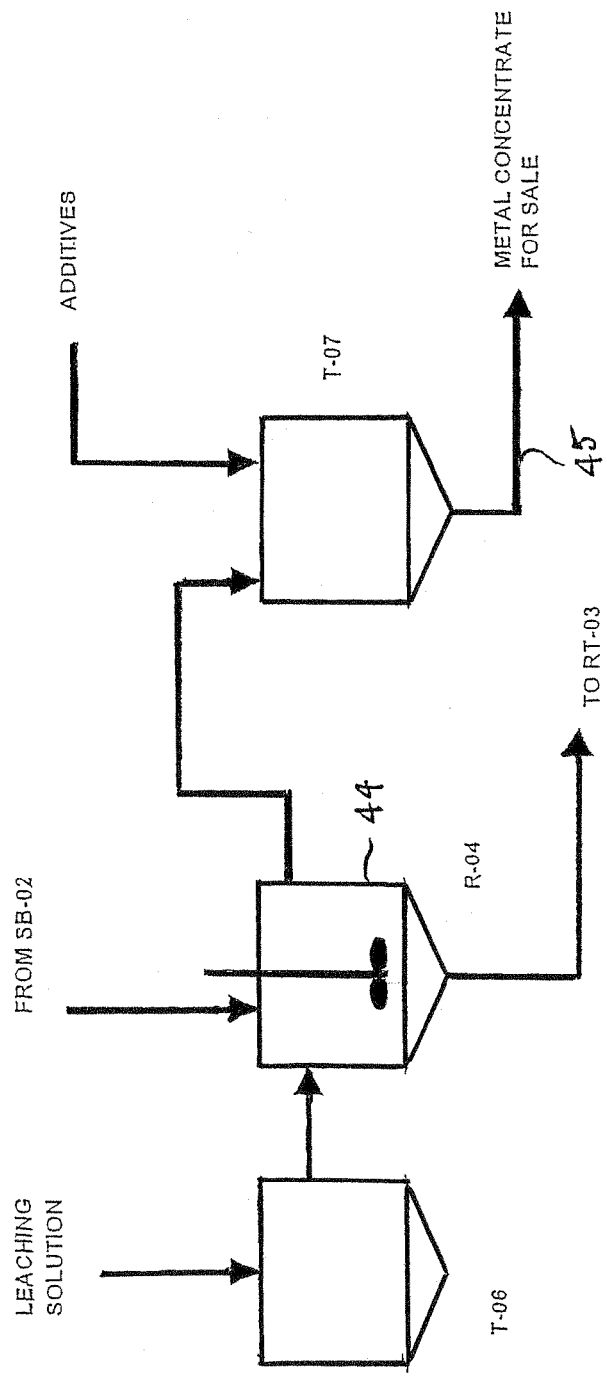
FIG. 7 is a schematic representation of a solids treatment portion of an apparatus for processing carbon-containing polymeric material in accordance with a sixth embodiment of the invention.

Referring now to FIG. 7, in a sixth embodiment, the solid material 22 may contain metals. For example, the carbon product 22, produced as a result of processing tyres, may contain zinc. The solid material 22 may then be processed in an agitated vessel 44. A leaching solution may be added to the agitated vessel 44 to extract the metal, producing a metal-rich leachate. The metal-rich leachate may be processed further by addition of other compounds or by crystallisation or evaporation, to produce a product 45. In one such application, product 45 can be sold as a liquid fertilizer.

Figure 8:
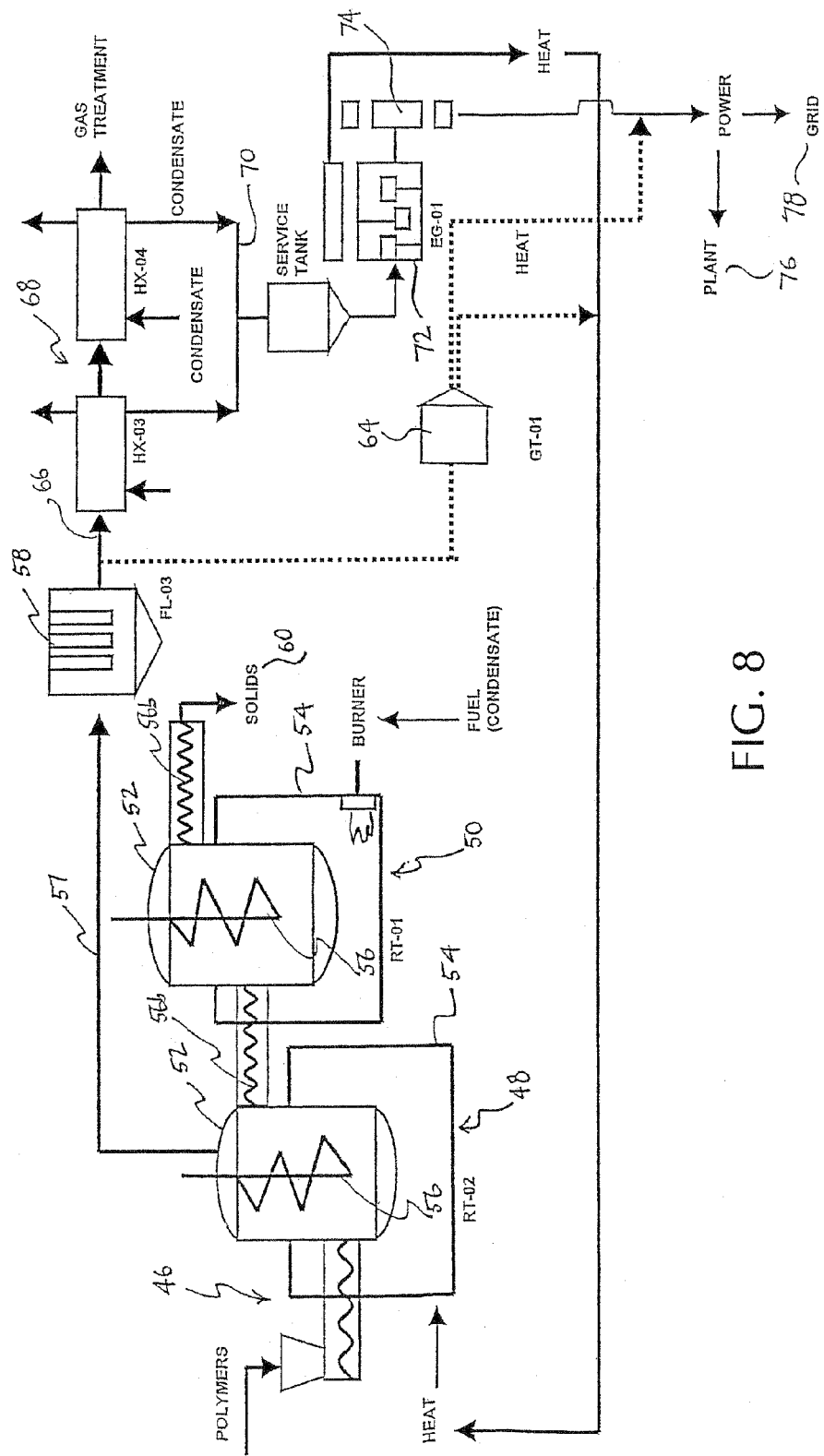
FIG. 8 is a schematic representation of a portion of an apparatus for processing carbon-containing polymeric material in accordance with a seventh embodiment of the present invention.
Figure 9:
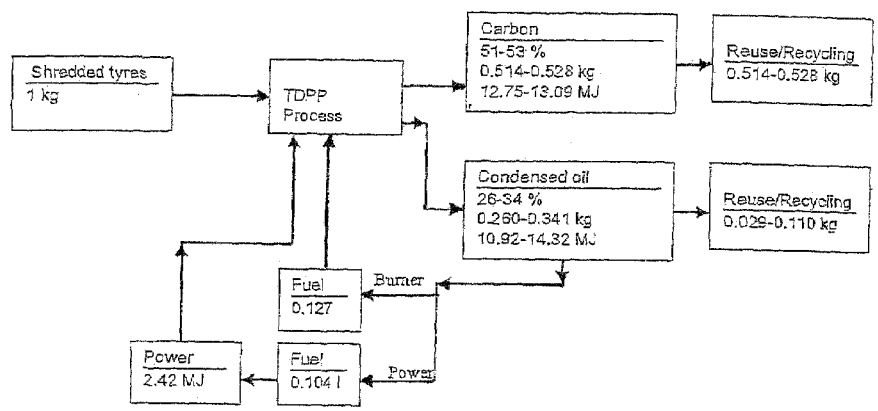
FIG. 9 is a schematic representation of two models developed to determine the feasibility of using a fraction of the recovered products as sources of energy.
Figure 9:
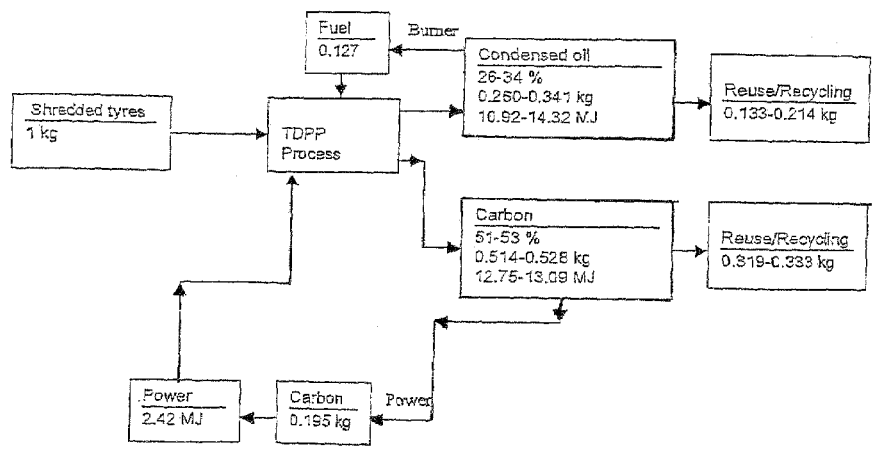

Referring finally to FIG. 8 there is schematically shown a portion of an apparatus for processing a carbon-containing polymeric material, comprising a polymer feed assembly 46, a first retort assembly 48 and a second retort assembly 50. Each retort assembly 48 or 50 in turn comprises a substantially cylindrical body 52 vertically disposed within a combustion chamber 54. Each retort assembly 48 or 50 further comprises an auger or stirrer 56, to agitate the contents of the retort and drive the product from the feed ponit to the outlet and provide an adequate residence time. An extraction system 56b, such as an auger is adapted to extract solid material from the cylindrical body 52.

Carbon-containing polymeric material is fed into the cylindrical body 52 of the first retort assembly 48, and heated indirectly within the cylindrical body 52 by way of the combustion chamber 54 thereof. A gaseous stream 57, produced thereby is passed through a filtration assembly 58, with the remaining partially processed carbon-containing polymeric material is then passed to the second retort assembly 50 for further treatment. Remaining solid material 60 is processed as described in the context of FIGS. 6 and 7.

Having passed through the filtration assembly 58, two options are possible. In a first option, the gas stream 62 Is directed to a gas turbine 64. Electricity produced by the gas turbine 64 may be used to power the plant 76 or fed into an electricity grid 78. Heat is also produced by the gas turbine 64. This heat can be used as part of the process to provide heat for the first and second retort assemblies 48 and 50. The second option involves the condensation of the gas stream 66, which is condensed by way of a series of condensers 68 to produce a condensate 70. The condensate is used to fuel a combustion engine 72, coupled to a generator 74. Heat produced by the combustion engine 74 is fed back to the first retort assembly 48, whilst the electricity produced by 74 may be used to power the plant or fed into an electricity grid.

Experimental Trials

Experimental trials were conducted in a unit comprising a vertical retort filled with sand as a heating medium, agitated with a helicoidal mixer. The mixer's speed could be regulated. The product is fed at the bottom of the vessel and is driven upwards in a fluidized bed regime, while it is subjected to heat supplied by two burners that heat the sand from an external combustion chamber. Products that are pyrolysed flow through the heat bed towards the gas treatment system. The pyrolysed solid is extracted from the top part of the vessel by a screw auger, whilst the gas is maintained at high temperature so it does not condense when it passes through the High Temperature Filter (HTF). The HTF removes particles from the gas stream, before this gas passes through a water-cooled condenser that separates condensable fractions. Two configurations were used. In the first one, an After Burner was used to destroy the non-condensed products, whilst in the second configuration a second condenser cooled with a glycol-water solution was used to increase recovery of hydrocarbons.

The whole system is PLC-controlled, with temperature, pressure, oxygen content and flows regulated by the system. The plant is described in FIGS. 1 and 3 discussed above.

The unit had a nominal capacity of two tonnes per hour. Throughput of the unit depends on a number of variables and the physicochemical characteristics of the feed. Moisture content, density, viscosity, calorific capacity, and composition have an effect on heat requirements, processing rates, and end products.

Two variables are important in the process: temperature and residence time. Operating temperature in the retort is the key variable that affects pyrolysis and thermal decomposition, with the quality and composition of the final products being in direct relationship to the operating temperature. Residence time is the other important variable, which affects composition of the final products and feed rates. The degree of cracking and decomposition is directly proportional to residence time. The unit further comprised a feeding hopper and screw conveyor to be able to feed granulated tyres into the retort.

1. Tyres

The trials consisted of the thermal pyrolysis of granulated tyres, with a particle size of 5 mm, screened of metal and fluff. Tests 0014, 0015, and 0016 were carried out using a TDPP configuration (see FIGS. 1 and 3). Analysis of the granulate tyres is presented in Table I:

TABLE I

Analysis of granulated tyres

| Parameter | | Result (in mg/kg)[1] | Result (in mg/kg)[2] |
|---|---|---|---|
| Antimony | | <5.0 | <0.5 |
| Cadmium | | <1.0 | 0.63 |
| Calcium | | 360 | 4290 |
| Mercury | | <0.50 | <0.2 |
| Nickel | | <1.0 | 1.7 |
| Sodium | | 49 | 340 |
| Arsenic | | | <0.5 |
| Silicon | | | 260 |
| Chromium | | | 1.6 |
| Phosphorus | | | 110 |
| Iron | | | 300 |
| Copper | | | 30 |
| Vanadium | | | <0.5 |
| Sulfur | | — | 18400 |
| Tin | | <2.0 | 1.2 |
| Zinc | | — | 13400 |
| Hydrocarbons(*) | C6–C9 | <25 | Nd |
| | C10–C14 | 97 | 45 |
| | C15–C28 | 12000 | 22000 |
| | C29–C36 | 46000 | 49000 |
| | Total | 58000 | 71000 |
| Ash content | | 41000 | 36,000 |
| Moisture | | 0.5% | |
| Calorific value | | | 37.21 MJ/kg |

(*)On a dry basis
[1]Test 0014 and 0015
[2]Test 0016, samples 020417-01-S-Feed-1020 and 020417-02-S-Feed-1020

The first set of trials, called for the running of two trials at two feed rates, to test the capabilities of the unit to process the feed material and handle the produced gases. The process conditions are summarized in Table II.

TABLE II

Process conditions

| Parameter | Test 0014 | Test 0015 |
|---|---|---|
| Temperature retort | 450° C. | 450° C. |
| Feed rate | 75 kg/hour | 130 kg/hour |
| Time | 20 hours | 20 hours |
| Pressure HTF clean side | 0.1 in H$_2$O | 0.1 in H$_2$O |
| Temperature condenser outlet | 20° C. max | 20° C. max |
| Temperature afterburner | 760° C. min | 760° C. min |
| Volume processed | 1750 kg | 625 kg |
| Volume condensed | 598 kg | 166 kg |
| Volume of solids produced | 900 kg | 330 kg |

Nitrogen was used as a blanketing inert gas to inhibit both oxidation and combustion during the process. Condensing of the generated gas was achieved by means of the on-line condenser, with cooling water circulated from the cooling tower.

The second set of trials was designed to prove the limits of the plant in terms of heat transfer and capacity. Sampling of the gas before and after the After Burner was also to be completed by a third party, with the samples analyzed for VOCs, SVOCs, PAHs, Dioxins and Furans, particulates, SOx, and heavy metals. The process conditions are summarized in Table V.

TABLE V

Process conditions

| Parameter | Test 0016 |
|---|---|
| Temperature retort | 450° C. |
| Feed rate | From 150 kg/hour to 350 kg/hour |
| Time | 80 hours |
| Pressure HTF clean side | 0.1 in H$_2$O |
| Temperature HTF bottom | 450° C. min |
| Temperature condenser HX-03 outlet | 30° C. max |
| Temperature condenser HX-04 outlet | 10° C. max |
| Temperature afterburner | 760° C. min |

Pyrolysis of tyres produces three streams: a hydrocarbon-rich oil, a solid char, and gas. The condensed oil was evaluated as a fuel substitute, or as a raw material for the separation of valuable fractions. The results are summarized in Table VI.

TABLE VI

Analysis of condensed oil

| Parameter | Method | C-11 | C-12 | C-13 |
|---|---|---|---|---|
| Sulfur (% w/w) | ASTM D5185 | 0.82 | 1.11 | 1.34 |
| Density, 15° C. (kg/l) | ASTM D4052 | 0.9116 | 0.9106 | 0.9336 |
| Ash (% w/w) | ASTM D482 | 0.0030 | 0.0270 | 0.0060 |
| Copper corrosion, 3 hours, 100° C. | ASTM D130 | 2b | 3a | 2b |
| Cetane Index | ASTM D4737 | 31 | 31 | 31 |
| Carbon residue (% w/w) | ASTM D4530 | 1.18 | 1.40 | 1.79 |
| Particulate matter (mg/l) | ASTM D2276 | 656 | 106 | 82 |
| Flash point (° C.) | ASTM D3828 | <24 | <24 | <24 |
| Viscosity, 40° C. (cSt) | ASTM D445 | 1.72 | 1.35 | 1.54 |
| Metals (mg/kg) | ASTM D5185 | | | |
| Iron | | 2 | 2 | 3 |
| Chromium | | <1 | <1 | <1 |
| Copper | | 4 | 1 | <1 |
| Tin | | <1 | <1 | <1 |
| Lead | | <1 | <1 | <1 |
| Silica | | 5 | 4 | 1 |
| Aluminum | | <1 | <1 | <1 |
| Sodium | | <1 | <1 | <1 |
| Phosphorus | | <1 | <1 | <1 |
| Zinc | | <1 | <1 | <1 |
| Calcium | | <1 | <1 | <1 |
| Lithium | | <1 | <1 | <1 |
| Vanadium | | <1 | <1 | <1 |

TABLE VII

Analysis of hydrocarbons in condensed oil by GC/MS

| Parameter | C-1 | C-2 | C-3 | C-5 | C-6 | C-7 |
|---|---|---|---|---|---|---|
| Benzene (% w/w) | 0.24 | 0.86 | 0.65 | 1.10 | 0.61 | 2.20 |
| Toluene (% w/w) | 1.50 | 3.80 | 2.70 | 3.80 | 2.70 | 7.90 |

TABLE VI

Process variables

| Parameter | Test 0016 | | | | | | | |
|---|---|---|---|---|---|---|---|---|
| Feed rate | 12% | 15% | 17.5% | 20% | 12% | 15%(*) | 25%() | 15%(*) |
| Feed rate (calculated based on 12% = 180 kg/hour) | 180 | 225 | 263 | 300 | 180 | 225 | 375 | 225 |
| Average feed rate | 195 kg/hour, calculated from volume processed in total time of feeding (64.59 hours) | | | | | | | |
| Volume processed | 12,531 kg from weight of material | | | | | | | |
| Volume processed | 16,250 kg calculated from feed rates | | | | | | | |
| Volume condensed | 4,634 kg in HX-03 307 kg in HX-04 | | | | | | | |
| Volume of solids produced | 3,208 kg (estimated) 825 kg from HTF | | | | | | | |

(*)The feed rate varied from 12 to 20%
(**)This is an estimated average
(***)The feed rate varied from 15 to 23%

TABLE VII-continued

Analysis of hydrocarbons in condensed oil by GC/MS

| Parameter | C-1 | C-2 | C-3 | C-5 | C-6 | C-7 |
|---|---|---|---|---|---|---|
| Ethyl Benzene (% w/w) | 0.82 | 1.70 | 1.60 | 2.40 | 2.50 | 4.10 |
| Xylenes (% w/w) | 1.80 | 3.70 | 3.20 | 3.50 | 2.50 | 7.40 |
| Total Hydrocarbon fractions | 4.36 | 10.06 | 8.15 | 10.80 | 8.31 | 21.60 |
| C6–C9 | 9.6 | 19.0 | 15.0 | 16.0 | 15.0 | 26.0 |
| C10–C14 | 36.0 | 32.0 | 28.0 | 27.0 | 33.0 | 25.0 |
| C15–C29 | 33.0 | 22.0 | 31.0 | 31.0 | 27.0 | 19.0 |
| C29–C36 | 0.4 | 0.1 | 1.7 | 1.9 | 0.1 | 0.5 |
| Total | 79.0 | 73.1 | 75.7 | 75.9 | 75.1 | 70.5 |

An analysis by GC/MS was also performed for a composite sample of the condensed product C-10. The scan indicated presence of a large number of compounds. Table VIII presents the twenty most abundant compounds.

TABLE VIII

The 20 most abundant compounds identified by GC/MS in sample C-10, with relative abundance indicated in parenthesis

| | |
|---|---|
| Toluene (4.56) | Trimethyl Benzene (1.52) |
| p-Xylene (3.64) | 2-Methylindene (1.44) |
| Ethyl Benzene (3.27) | 1,3-bis (3-phenoxyphenoxy) Benzene (1.31) |
| 1-methyl-4-(1-methylethyl) Benzene (2.76) | 2-ethenyl Naphtalene (1.09) |
| 2-methyl Naphtalene (2.44) | 1-methyl-4-(1-methylenethen) Benzene (0.95) |
| Naphtalene (2.37) | 2,6-dimethyl Naphtalene (0.97) |
| Trimethyl Benzene (2.36) | 1,5-dimethyl Naphtalene (0.95) |
| o-Xylene (2.22) | Fluorene (0.91) |
| (1-methyl-2-cycloprepen-1) Benzene (1.75) | Indane (0.90) |
| 2-methyl Naphtalene (1.64) | 1,3-dimethyl 1H-Indene (0.87) |

Analysis of the data indicates that the following families of compounds are present: Benzene and Alkyl Benzenes, Naphtalene and Alkyl Naphtalenes, Fluorenes and Indenes, Anthracenes, Phenantrenes, Pyrenes, Biphenyls, and some Phenols. Some Sulfur compounds have been identified, such as Benzothiazole, and Dibenzothiophene.

TABLE IX

Estimated Average Composition for Condensed Oil

| Composition | % w/w |
|---|---|
| Hydrocarbons C6–C36 | 74.9% |
| Estimated Hydrocarbons <C7 | 10% |
| Estimated Sulphur compounds | 4.1% |
| Carbon | 1.5% |
| Unidentified fractions | 9.5% |
| Total | 100.0% |

In Test 0016 liquid samples were collected from two points: Tank 305, receiving the fraction condensed by HX03, and Tank 306, receiving the fraction condensed by HX04 (FIG. 1b). These two condensers operated under the following conditions:

TABLE XI

Operating conditions of condensers in Test 0016

| | | Gas temperature (° C.) | |
|---|---|---|---|
| Condenser | Cooling medium | $T_1$ | $T_2$ |
| HX03 | Water | 320–380 | 21–24 |
| HX04 | Water-glycol | 21–24 | 7–8 |

A sample of condensate was analyzed before and after separation of water (L305-BP and L305D-BP, respectively), to assess it as a fuel. Two separate samples from Tank 305 and 306, respectively, were analyzed by a second independent laboratory. The analysis results are presented in Table XII.

TABLE XII

Analysis of condensed oil Test 0016

| Parameter | Method | L-305D-BP[1] | L-305-BP[2] | L-305-1300[3] | L-306-1300[4] |
|---|---|---|---|---|---|
| Sulphur (% w/w) | ASTM D4294 | 1.814 | 1.759 | 1.34[5] | 1.16[5] |
| Density, 15° C. (kg/l) | ASTM D1298 | 0.9421 | 0.9535 | 0.9323[6] | 0.8976[6] |
| Ash (% w/w) | ASTM D482 | 0.006 | 0.005 | <0.01 | <0.01 |
| Copper corrosion, 3 hours, 100° C. | ASTM D130 | | | | |
| Cetane index | ASTM D4737 | | | | |
| Carbon residue (% w/w) | ASTM D4530 | 5.0 | 3.5 | | |
| Particulate matter (mg/l) | ASTM D2276 | | | 100[7] | 30[7] |
| Flash point (° C.) | ASTM D3828 | Ambient | Ambient | <-7 | <-7 |
| Viscosity, 40° C. (cSt) | ASTM D445 | 1.814 | 1.759 | 1.62 | 1.16 |
| Water by distillation % v | ASTM D95 | 0.15 | 27 | | |
| Strong acid number mg KOH/g | ASTM D664 | Nil | Nil | | |
| Total acid number mg KOH/g | ASTM D664 | 0.468 | 4.901 | 0.5 | 0.6 |
| Nitrogen (ppm) | ASTM D4629 | 3794 | 3642 | | |
| Nitrogen (ppm) | ASTM D3228 | 3807 | 3500 | | |
| Pour point (° C.) | ASTM D97 | <-15 | <-15 | | |
| Compatibility by spot | ASTM D4740 | N° 4 | N° 5 | | |
| Stability by spot | ASTM D4740 | N° 4 | N° 5 | | |
| TSP (% w/w) | IP390 | 0.08 | 0.08 | | |
| TSE (% w/w) | IP375 | 0.10 | 0.10 | | |
| Sediments by extraction (% w/w) | ASTM D473 | 0.08 | 0.09 | | |
| Asphaltenes (% w/w) | IP143 | 1.1 | 0.6 | | |
| Calorific value (MJ/kg) | AS 1038.5 | | | 42.00 | 42.27 |

TABLE XII-continued

Analysis of condensed oil Test 0016

| Parameter | Method | L-305D-BP[1] | L-305-BP[2] | L-305-1300[3] | L-306-1300[4] |
|---|---|---|---|---|---|
| Metals (mg/kg) | ASTM D5185 | | | | |
| Iron | | | | <1 | <1 |
| Chromium | ASTM D5185 | | | <1 | <1 |
| Cupper | ASTM D5185 | | | <1 | <1 |
| Tin | ASTM D5185 | | | <1 | <1 |
| Lead | IP377 | <1 | <1 | <1[8] | <1[8] |
| Silica | IP377 | 2 | 2 | 3[8] | 3[8] |
| Aluminum | IP377 | 1 | <1 | <1[8] | <1[8] |
| Sodium | IP377(mod) | 1 | <1 | 3[8] | 3[8] |
| Phosphorus | | <1 | | nd | nd |
| Zinc | IP377 | <1 | <1 | <1[8] | <1[8] |
| Calcium | IP377 | 1 | 3 | <1[8] | <1[8] |
| Lithium | | <1 | | — | — |
| Vanadium | IP377 | 1 | <1 | <1[8] | <1[8] |
| Nickel | IP377 | 10 | 2 | — | — |

[1]Sample taken on Apr. 18, 2002 from Tank 305, analyzed by BP Refinery (Kwinana) Australia, after water setting and decanting
[2]Analysis of sample L-305-BP before water setting and decanting
[3]Sample taken on Apr. 18, 2002 from Tank 305, at 1 PM, analyzed by Geotech Australia
[4]Sample taken on Apr. 18, 2002 from Tank 306, at 1 PM, analyzed by Geotech Australia
[5]By method AS 1036.6.3.3
[6]By method IP 190
[7]Based on method ASTM D5452
[8]By method ASTM D5185

Distillation of the lighter fraction was used to increase the flash point of the condensate from Test 0016, in order to conduct corrosion tests. The results are presented in Table XIV.

TABLE XIV

Flash point and corrosion test before and after distillation, Test 0016

| Parameter | Method | L-305-1300[1] | L-306-1300DS[2] |
|---|---|---|---|
| Flash point (° C.) | ASTM D3828 | <−7 | 42 |
| Copper corrosion, 3 hours, 1000 C | ASTM D130 | — | 2c |

[1]Sample taken on Apr. 18, 2002 from Tank 305, at 1 PM, analyzed by Geotech Australia
[2]Sample taken after distillation of 20% of L-305-1300, analyzed by Geotech Australia In order to study the composition of the product and characterize the different fractions, the two samples from Tanks 305 and 306 respectively, were analyzed using Methods USEPA 8260, 8270, and 8015B to quantify volatile and semivolatile organic compounds and establish total hydrocarbons and their fractions. These results are presented in Table XV.

TABLE XV

Analysis of condensed oil Test 0016 (mg/L)

| Analyte | L-305-1300[1] | L-306-1300[2] |
|---|---|---|
| 1,2,4-Trimethylbenzene | 5600 | 3200 |
| 1,3,5-Trimethylbenzene | 2800 | 1500 |
| Benzene | 9300 | 14000 |
| Ethylbenzene | 11000 | 9100 |
| Isopropylbenzene | 3100 | 1700 |
| Naphtalene | 3700 | 2400 |
| n-Propylbenzene | 1700 | 900 |
| Styrene | 6000 | 3800 |
| t-butylbenzene | 920 | <10 |
| Toluene | 17000 | 18000 |

TABLE XV-continued

Analysis of condensed oil Test 0016 (mg/L)

| Analyte | L-305-1300[1] | L-306-1300[2] |
|---|---|---|
| Xylene | 24000 | 17000 |
| PAH | 5709 | 4896 |
| Phenols | 6900 | 3650 |
| Hydrocarbon fractions | | |
| C6–C9 | 290000 | 360000 |
| C10–C14 | 270000 | 250000 |
| C15–C29 | 290000 | 270000 |
| C29–C36 | 74000 | 77000 |
| Total | 920000 | 960000 |

[1]Sample taken on Apr. 18, 2002 from Tank 305, at 1 PM, analyzed by Geotech Australia
[2]Sample taken on Apr. 18, 2002 from Tank 306, at 1 PM, analyzed by Geotech Australia No chlorinated compounds, ethers, and chlorophenols were detected. The composition of the condensed oil is presented in Table XVI:

TABLE XVI

Average Composition for Condensed Oil from Test 0016

| Composition | % w/w |
|---|---|
| Hydrocarbons C6–C36 | 92% |
| Estimated Sulphur compounds | 5.9% |
| Carbon | 1.5% |
| Water and sediments | 0.3% |
| Other unidentified compounds | 0.3% |
| Total | 100.0% |

The results from all trials indicate that the majority of the hydrocarbons are aromatic in nature, predominantly alkyl Benzenes. The composition of the condensate in Test 0016 is consistent with Test 0014 and 0015, but has improved considerably. The condensate contains 92% of hydrocarbons, of which over 92% are C29 or below. The high calorific value and low metal content are also important features of the product. Compatibility tests indicate that the product is suitable as a fuel oil blending component.

Gas is produced during the process, in the form of hydrogen, methane, and light hydrocarbons. Gas sampling and analysis was undertaken to establish composition of the gas, determine the efficiency of the pollution control devices, and demonstrate the compliance of the plant with stringent environmental standards. The results of the analysis of the gas samples are presented in the table below:

TABLE XVIII

Emissions to atmosphere as detected in Test 0016 in mg/Nm³

| Parameter | Emissions |
|---|---|
| SO₂ | 49[1] |
| VOCs | 2.0[2] |
| SVOCs | Nd[3] |
| Dioxins and Furans | Nd[4] |
| Particulates | 4[5] |
| Nitrogen oxides | 22.4[6] |
| Heavy metals | 0.37[7] |

[1]Sampling method: USEPA Method 1 and Method 2, Analysis method: USEPA Method 6C
[2]Sampling method: USEPA Method 1 and Method 2, Analysis method: USEPA Method 18 and Method 0030
[3]Sampling method: USEPA Method 1 and Method 2, Analysis method: USEPA Modified Method 5
[4]Sampling method: USEPA Method 1 and Method 2, Analysis method: USEPA Method 23
[5]Sampling method: USEPA Method 1 and Method 2, Analysis method: USEPA Method 5
[6]Sampling method: USEPA Method 1 and Method 2, Analysis method: USEPA Method 7E
[7]Sampling method: USEPA Method 1 and Method 2, Analysis method: USEPA Method 29

TABLE XIX

Composition of hydrocarbons C1 to C6 before and after the afterburner in mg/Nm³

| Analyte | Before afterburner | After afterburner |
|---|---|---|
| Methane | 4071 | Nd |
| Ethene | 2125 | Nd |
| Ethane | 3348 | Nd |
| Propane | 2946 | 29 |
| Butane | 2356 | 116 |
| Pentane | 1031 | 562 |
| Hexane | 226 | 200 |

The gas has high concentrations of hydrocarbons with high calorific values.

The third stream produced from the pyrolysis process is char. Potential uses of the char obtained from the pyrolysis of tyres include its reuse as carbon black, its use as a solid fuel, and applications as adsorbents. The char was analyzed to determine Sulphur and hydrocarbon fractions. The results are presented in Table XXI.

TABLE XXI

Analysis of hydrocarbons and Sulphur in char samples

| Parameter | S-1 | S-2 | S-3 | S-6 |
|---|---|---|---|---|
| Sulphur (% w/w) | 0.82 | 0.81 | 1.20 | 1.50 |
| Ash (% w/w) | 89.5 | 86.2 | 71.7 | Not analized |
| Moisture (% w/w) | 0.0 | 0.1 | 0.3 | 0.1 |
| Hydrocarbon fractions (mg/kg) | | | | |
| C6–C9 | <25 | <25 | 160 | 25 |
| C10–C14 | 200 | 610 | 1100 | 51 |
| C15–C29 | 3500 | 5000 | 6600 | 1200 |
| C29–C36 | 4700 | 4600 | 4700 | 1300 |
| Total | 8500 | 8500 | 10000 | 2600 |

The changes in the design of TDPP-III compared to TDPP-II produced a char with only traces of Toluene and Xylene, whilst no other organic compounds were detected. The reduced level of hydrocarbons produced a reduction in the calorific value and a decrease in the ratio of mass of char produced per mass of tire. This supports a model where gas and condensate are maximized in detriment of the mass of char produced, resulting in an improved model for energy production based on use of gas and liquid only. The distribution of compounds between char and oil is shown in Table XXIII.

TABLE XXIII

Analysis of char and oil from Test 0016

| Analyte | S-OF-1300[1] | L-305-1300[2] |
|---|---|---|
| Sulphur (% w/w) | 0.57 | 1.34 |
| Ash (% w/w) | 53 | <0.01 |
| Calorific value (MJ/kg) | 10.61 | 42.00 |
| Iodine number (mg I₂ absorbed/g carbon) | 75 | — |
| Hydrocarbon fractions (mg/kg) | | |
| C6–C9 | Nd | 290000 |
| C10–C14 | Nd | 270000 |
| C15–C29 | Nd | 290000 |
| C29–C36 | Nd | 74000 |
| Total | Nd | 920000 |
| 1,2,4-Trimethylebenzene | <1.0 | 5600 |
| 1,3,5-Trimethylebenzene | <1.0 | 2800 |
| Benzene | <1.0 | 9300 |
| Ethylbenzene | <1.0 | 11000 |
| Isopropylbenzene | <1.0 | 3100 |
| Naphtalene | <1.0 | 3700 |
| n-Propylbenzene | <1.0 | 1700 |
| Styrene | <1.0 | 6000 |
| t-butylbenzene | <1.0 | 920 |
| Toluene | 12 | 17000 |
| Xylene | 2.3 | 24000 |
| PAH | Nd | 5709 |
| Phenols | Nd | 6900 |

[1]Sample taken on Apr. 18, 2002 from out feed bin, at 1 PM, analyzed by Geotech Australia
[2]Sample taken on Apr. 18, 2002 from Tank 305, at 1 PM, analyzed by Geotech Australia The mass balance has been estimated based on field measurements taken during Test 0014, 0015, and 0016. The gas produced from the pyrolysis of the tyres was destroyed by combustion in the After Burner. A balance of mass and an estimate of the elemental composition of the initial product and the produced char and oil is presented in Table XXVIII.

TABLE XXVIII

Estimated balance of mass from elemental composition of tyres, char, and condensed oil

| | | Per kg of tyres | Source | Carbon | Hydrogen | Oxygen | Nitrogen | Sulfur | Other | Total |
|---|---|---|---|---|---|---|---|---|---|---|
| Tyres | % w/w | 1 | (1) | 78.38% | 6.48% | 3.86% | 0.18% | 1.84% | 9.26% | 100.00% |
| | kg/kg tyres | | | 0.784 | 0.065 | 0.039 | 0.002 | 0.018 | 0.093 | 1.000 |
| Char | % w/w | 0.322 | (2) | 35.54% | 0.00% | 14.78% | 0.00% | 0.57% | 49.11% | 100.00% |
| | kg/kg tyres | | | 0.114 | — | 0.048 | — | 0.002 | 0.158 | 0.322 |
| Oil | % w/w | 0.394 | (3) | 90.92% | 7.58% | 0.00% | 0.00% | 1.34% | 1.50% | 101.34% |
| | kg/kg tyres | | | 0.358 | 0.030 | 0.000 | 0.000 | 0.005 | 0.006 | 0.399 |
| Gas | % w/w | 0.36 | (4) | 87.06% | 9.78% | 0.00% | 0.00% | 3.16% | 0.00% | 100.00% |
| | kg/kg tyres | | | 0.31 | 0.03 | — | — | 0.01 | — | 0.36 |

| Estimated molar ratios | Carbon to hydrogen |
|---|---|
| Tyres | 1.0 |
| Oil | 1.0 |
| Gas | 0.7 |

(1) Elemental analysis performed by Geotech Australia
(2) Elemental analysis performed by Geotech Australia, sulfur analysis by Geotech Australia, and "other" includes adjusted ash content
(3) Estimated from fractions for total petroleum hydrocarbons, as analysed by Geotech Australia. A weighted average molecular weight has been calculated from each hydrocarbon fraction, allowing for double bonds
(4) Estimated from balance of mass for carbon, hydrogen, and sulfur Table XXVIII has been used to estimate the composition of the gas. The model simplifies the composition to Methane, Ethylene, Carbon Monoxide and Dioxide, and Hydrogen Sulfide, as these five gases account to over 96% of the gases, although other gases are present. The data is presented in Table XXVIIIb.

TABLE XXVIIIb

Estimated composition of pyrolysis gas

Test 0016

| Parameter | Total | Per kg of tyres |
|---|---|---|
| Mass into gas phase | | 0.360 kg |
| Methane | 42.86% | 0.154 kg |
| Ethylene | 23.81% | 0.086 kg |
| CO | 8.33% | 0.030 kg |
| $CO_2$ | 16.66% | 0.060 kg |
| $H_2S$ | 1.98% | 0.007 kg |
| Total | 93.64% | 0.337 kg |

The results of gas analysis confirm that Methane Is the most abundant gas, with ethane and ethylene also present in significant quantities. The percentages of the gas mix are presented in Table XXVIIIc, based on results presented in Table XIX.

TABLE XXVIIIc

Composition of hydrocarbons C1 to C6 before the afterburner in $mg/Nm^3$

| Analyte | Concentration ($mg/Nm^3$) | % |
|---|---|---|
| Methane | 4071 | 44.89% |
| Ethylene | 2125 | 13.39% |
| Ethane | 3348 | 19.69% |
| Propane | 2946 | 11.81% |
| Butane | 2356 | 7.17% |
| Pentane | 1031 | 2.60% |
| Hexane | 226 | 0.46% |

In order to provide an estimate of calorific value from the gas, an average calorific value was calculated using 50 MJ/kg as a conservative value. The estimates are presented in Table XXIX.

TABLE XXIX

Energy and generation estimate for pyrolysis gas

| Parameter | Test 0014 |
|---|---|
| Gas produced | 0.360 kg/kg of tyres |
| Calorific value | 50 MJ/kg of gas |
| Total energy from Methane gas only | 8.08 MJ/kg of tyres |

2. Plastics

Process conditions for the pyrolysis of plastics are presented in Table XXX.

TABLE XXX

Process conditions

| Parameter | |
|---|---|
| Temperature retort | 450–700° C. |
| Feed rate | 200–2000 kg/hour |
| Temperature condenser outlet | 15° C. max |
| Temperature afterburner | 860° C. min |
| Condensed pyrolysis oil | 50–70% w/w |
| Pyrolysis char | 5–10% w/w |
| Gas | 20–45% w/w (estimated) |

The process' temperature can be regulated to increase the production of pyrolysis gas. The gas stream can be used directly as fuel for a gas turbine, with solids removed in the HTF. The composition of the gas and oil varies with the fed plastic mix. Likely compositions are as follows:

TABLE XXXI

Process outputs

| Plastic fed | Outputs |
|---|---|
| Polypropylene | Pyrolysis oil is composed of hydrocarbons with 6 to 15 carbons, 5–10% water, less than 100 ppm Sulfur, less than 30 ppm Chlorine, less than 20 ppm combined metals. Oil meets CIMAC fuel specifications. |
| Polystyrene | Pyrolysis oil is composed of hydrocarbons with 8 to 16 carbons, 5–10% water, less than 100 ppm Sulfur, less than 30 ppm Chlorine, less than 20 ppm combined metals. The oil has 50–70% aromatic compounds, mainly ethyl benzene, toluene, xylene, and methyl-ethylebenzene. Oil meets CIMAC fuel specifications. |

Solids extracted from the retort contain carbon, silicates, metal oxides, sulfates, alumina, and other compounds.

3. Grease

Tests were conducted to demonstrate the applicability of the apparatus to the processing of waste hydrocarbon grease, using a configuration that included a water-cooled condenser and the After Burner. Feeding of the grease was achieved using a positive displacement pump.

Process conditions are summarized in Table XXXII.

TABLE XXXII

Process conditions

| Parameter | |
|---|---|
| Temperature retort | 400° C. |
| Feed rate | 200 kg/hour |
| Time | 28 hours |
| Pressure HTF clean side | 0.1 in $H_2O$ |
| Temperature condenser outlet | 15° C. max |
| Temperature afterburner | 860° C. min |
| Condensed pyrolysis oil | 40% w/w |
| Pyrolysis char | 21% w/w |
| Gas | 39% w/w (estimated) |

The trial was run at temperatures of 400–430° C.

Analysis of the condensed oil was performed, with the objective of evaluating the pyrolysis oil as a fuel. The results are summarized in Table XXXIII.

TABLE XXXIII

Analysis of condensed oil

| Parameter | Method | PH010102A |
|---|---|---|
| Sulfur (% w/w) | ICP AES | 0.17 |
| Density, 15° C. (kg/l) | ASTM D4052 | 0.8649 |
| Ash (% w/w) | ASTM D482 | 0.0024 |
| Copper corrosion, 3 hours, 100° C. | ASTM D130 | 1b |
| Cetane index | ASTM D976 | 55 |
| Carbon residue (% w/w) | ASTM D524 | 1.68 |
| Water & sediments (% v/v) | ASTM D2709 | 0.01 |
| Flash point (° C.) | ASTM D3828 | <30 |
| Viscosity, 40° C. (cSt) | ASTM D445 | 7.34 |
| Distillation, simulated D86 | ASTM D2887 | |
| 10% recovered | ° C. | 165.5 |
| 20% recovered | ° C. | 235.0 |
| 30% recovered | ° C. | 295.5 |
| 50% recovered | ° C. | 389.0 |
| 70% recovered | ° C. | 448.5 |
| 80% recovered | ° C. | 479.0 |
| 90% recovered | ° C. | 510.5 |

The sample was subjected to flash distillation producing a final product with a flash point of 71° C. that met specifications as a fuel for combustion engines, similar in properties to marine diesel fuel, based on CIMAC standards.

Modifications and variation such as would be apparent to the skilled addressee are considered to fall within the scope of the present invention.

The invention claimed is:

1. An apparatus, when used for the processing of a carbon-containing polymeric material, the apparatus comprising a retort assembly which includes a retort disposed at least partially within a combustion chamber, the retort containing an inert heat-transfer medium, and an agitation means and the combustion chamber having heating means to indirectly heat the retort, wherein the agitation means is adapted to agitate the inert heat transfer medium and the carbon containing polymeric material.

2. An apparatus as claimed in claim 1 characterised in that the agitation means is adapted to agitate the inert heat transfer medium and the carbon containing polymeric material to create a fluidised bed, or fluidised bed-like effect.

3. An apparatus as claimed in claim 1 characterised in that the agitation means is controllable, whereby the residence time of the solid material in the retort may be controlled.

4. An apparatus as claimed claim 1 characterised in that a longitudinal axis of the retort is inclined to the horizontal, and the retort is bottom fed.

5. An apparatus as claimed in claim 1 characterised in that the agitation means is further adapted to facilitate the transport of the polymeric material and the inert heat-transfer medium through the retort.

6. An apparatus as claimed in claim 5 characterised in that the agitation means is provided in the form of an auger.

7. An apparatus as claimed in claim 1 characterised in that the retort is adapted to allow the exclusion of air or oxygen.

8. An apparatus as claimed in claim 1 characterised in that the retort comprises a substantially cylindrical body.

9. An apparatus as claimed in claim 8 characterised in that the substantially cylindrical body is mounted for rotation about its longitudinal axis.

10. An apparatus as claimed in claim 1 characterised in that the retort is substantially surrounded by the combustion chamber to enable direct heating of the retort.

11. An apparatus as claimed in claim 1 characterised in that the apparatus further comprises a high temperature filter through which the gaseous stream may pass after leaving the retort and prior to entering an afterburner.

12. An apparatus as claimed in claim 1 characterised in that the heat transfer medium is provided in the form of sodium silicate, or sand.

13. An apparatus as claimed in claim 1 characterised in that the heat transfer medium is provided in the form of alumina.

14. An apparatus as claimed in claim 1 characterised in that the retort contains one or more catalysts.

15. An apparatus as claimed in claim 1 characterised in that the apparatus additionally comprises an afterburner, means to transfer a gaseous stream from the retort to the afterburner for combustion and means for passing the combustion gases from the afterburner to the retort assembly to provide heat for heating carbon-containing polymeric material in the retort.

16. An apparatus as claimed in claim 1 characterised in that the apparatus further comprises one or more condensers wherein each condenser is adapted to condense gaseous products produced by heating the polymeric material.

17. An apparatus as claimed in claim 1 characterised in that the apparatus further comprises a combustion engine, wherein the engine is adapted to receive and be fuelled by condensed gaseous products produced by heating the polymeric material until it decomposes, pyrolyses or desorbs.

18. An apparatus as claimed in claim 17 characterised in that the engine is a gas turbine adapted to generate electricity from the gases produced from the decomposition of the polymeric materials, without prior condensation.

19. A method for the processing of carbon-containing polymeric material, the method comprising the steps of:
   introducing the carbon-containing polymeric material into the retort of a retort assembly which includes a retort disposed at least partially within the combustion chamber, the retort containing an inert heat-transfer medium and an agitation means, wherein the agitation means is adapted to agitate the inert heat transfer medium and the carbon containing polymeric material, the combustion chamber having heating means to indirectly heat the rotatable retort;
   heating the carbon-containing polymeric material and the inert heat transfer medium to cause such to at least partially decompose;
   discharging processed carbon-containing polymeric material from the retort.

20. A method according to claim 19 characterised in that the agitation means is adapted to agitate the inert heat transfer medium and the carbon containing polymeric material to create a fluidised bed, or fluidised bed-like effect, and the method includes the step of agitating the inert heat transfer medium and the carbon containing polymeric material to produce a fluidised bed or fluidised bed effect.

21. A method according to claim 19 characterised in that the agitation means is controllable, whereby the residence time of the solid material in the retort may be controlled.

22. A method according to claim 19 characterised in that the steps of the method are performed concurrently.

23. A method according to claim 19 characterised in that the method comprises the further step of:
   controlling the rate of passage of the carbon-containing polymeric material through the retort, such that the carbon-containing polymeric material is retained in the retort for a predetermined residence time.

24. A method according to claim 19 characterised in that the step of heating the carbon-containing polymeric material to cause such to at least partially decompose is performed in a substantially oxygen-free atmosphere.

25. A method according to claim 24 characterised in that the step of heating the carbon-containing polymeric material to cause such to at least partially decompose is performed in an inert gas atmosphere.

26. A method according to claim 24 characterised in that the step of heating the carbon-containing polymeric material to cause such to at least partially decompose is performed in an atmosphere substantially comprising nitrogen gas.

27. A method according to claim 19 characterised in that the carbon-containing polymeric material is provided in the form of one or more tyres.

28. A method according to claim 27 characterised in that the step of heating the carbon-containing polymeric material to cause such to at least partially decompose more specifically comprises the step of heating the tyres to between about 400–800° C.

29. A method according to claim 27 characterised in that the step of heating the carbon-containing polymeric material to cause such to at least partially decompose more specifically comprises the step of heating the tyres to between about 450–600° C.

30. A method according to claim 27 characterised in that the step of heating the carbon-containing polymeric material to cause such to at least partially decompose more specifically comprises the step of heating the tyres to about 450° C.

31. A method according to claim 27 characterised in that the residence time of the tyres in the retort is between about 30 and 240 minutes.

32. A method according to claim 27 characterised in that the residence time of the tyres in the retort is between about 45 and 180 minutes.

33. A method according to claim 27 characterised in that the residence time of the tyres in the retort is approximately 130 minutes.

34. A method according to claim 27 characterised in that, before the step of introducing the tyres into the retort, the method of the present invention comprises the preliminary step of shredding the tyres.

35. A method according to claim 19 characterised in that the carbon-containing polymeric material is provided in the form of one or more plastics.

36. A method according to claim 19 wherein the carbon-containing polymeric material is provided in the form of one or more plastics characterised in that the step of heating the plastics material to cause such to at least partially decompose more specifically comprises the steps of heating the carbon-containing polymeric material to melt such before heating the carbon-containing polymeric material to pyrolyse such.

37. A method according to claim 35 characterised in that the plastics include one or more halogen containing polymers, and the method comprises the step of treating a gas stream produced from the pyrolysis to remove hydrogen chloride.

38. A method according to claim 35 characterised in that the plastics are heated to between about 300 and 1200° C.

39. A method according to claim 35 characterised in that the plastics are heated to between about 450–1000° C.

40. A method according to claim 35 characterised in that the plastics are heated to about 550° C.

41. A method according to claim 35 characterised in that the residence time of the plastics in the retort is between about 30 and 240 minutes.

42. A method according to claim 35 characterised in that the residence time is between about 45 and 120 minutes.

43. A method according to claim 35 characterised in that the residence time is approximately 80 minutes.

44. A method according to claim 19 characterised in that the carbon containing polymeric material is provided in the form of a cellulosic material, the cellulosic fibres thereof being pyrolysed to produce fractions of shorter molecules with properties consistent with those of liquid fuels obtained from biomass.

45. A method according to claim 44 characterised in that the step of heating the cellulosic material to cause such to at least partially decompose more specifically comprises the step of heating the cellulosic material to between about 400 and 800° C.

46. A method according to claim 44 characterised in that the step of heating the cellulosic material to cause such to at least partially decompose more specifically comprises the step of heating the cellulosic material to between about 450 and 800° C.

47. A method according to claim 44 characterised in that the step of heating the cellulosic material to cause such to at least partially decompose more specifically comprises the step of heating the cellulosic material to about 500° C.

48. A method according claim 44 characterised in that the residence time of the cellulosic material in the retort is between about 30 and 240 minutes.

49. A method according to claim 44 characterised in that the residence time of the cellulosic material in the retort is between about 45 and 120 minutes.

50. A method according to claim 44 characterised in that the residence time of the cellulosic material in the retort is approximately 80 minutes.

51. A method according to claim 19 characterised in that the method further comprises the step of:
  reducing the pressure in the retort to enable lower temperatures to be used.

52. A method according to claim 19 characterised in that the step of discharging processed carbon-containing polymeric material from the retort includes separating the heat transfer medium from the processed carbon-containing polymeric material.

53. A method according to claim 52 characterised in that the step of separating the heat transfer medium from the processed carbon-containing polymeric material more specifically comprises:
  separating the heat transfer medium from the processed carbon-containing polymeric material based on density differences.

54. A method according to claim 19 characterised in that, where the carbon-containing polymeric material decomposes into a gaseous stream, the method comprises the step of:
  filtering the gaseous stream to remove particulate material therefrom.

55. A method according to claim 19 characterised in that, where the carbon-containing polymeric material decomposes into a gaseous stream, the method comprises the step of:
  condensing at least a portion of the gaseous stream to produce a condensate.

56. A method according to claim 55 characterised in that the step of condensing at least a portion of the gaseous stream more specifically comprises:
  fractionating at least a portion the gaseous stream to produce a range of condensate fractions.

57. A method according to claim 55 characterised in that the method comprises the further steps of:
  fractionating at least a portion the gaseous stream to produce a range of condensate fractions; and
  subjecting the condensate to flash distillation.

58. A method according to claim 54 characterised in that the method comprises the further step of:
  combusting the gaseous stream to provide heat for heating the carbon-containing polymeric material.

59. A method according to any one of claims 54 characterised in that the method comprises the further step of:
  combusting the gaseous stream in a gas turbine to generate heat and electricity.

60. A method according to claim 54 characterised in that the method comprises the further step of:
  combusting the gaseous stream in an afterburner or thermal oxidiser.

61. A method according to claim 19 characterised in that, where the carbon-containing polymeric material is provided in the form of a solid, the carbon-containing polymeric material may be passed through a grizzly or sieve, to remove oversized material, prior to being introduced into the retort.

62. A method according to claim 19 characterised in that, where the carbon-containing polymeric material is provided in the form of a solid, the carbon-containing polymeric material may be shredded or milled to reduce particle size and may include a separation stage, during which metals or other material may be separated from the carbon-containing polymers.

63. A method according claim 19 characterised in that, where the carbon-containing polymeric material is provided in the form of a liquid, the water content of the carbon-containing polymeric material is minimised prior to introducing such into the retort, optionally by preheating the liquid carbon-containing polymeric material to boil off any water.

* * * * *